United States Patent
Malin

(10) Patent No.: US 7,622,682 B2
(45) Date of Patent: Nov. 24, 2009

(54) SYSTEM AND METHOD FOR SECURING ELECTRICAL CABLE USING MANUALLY LINKABLE CABLE FASTENING CLIPS

(75) Inventor: Glen K. Malin, Rye, NY (US)

(73) Assignee: Allied Bolt, Inc., Hollis, NY (US)

( * ) Notice: Subject to any disclaimer, the term of this patent is extended or adjusted under 35 U.S.C. 154(b) by 115 days.

(21) Appl. No.: 11/343,699

(22) Filed: Jan. 31, 2006

(65) Prior Publication Data

US 2007/0175653 A1    Aug. 2, 2007

(51) Int. Cl.
H01B 7/00    (2006.01)
(52) U.S. Cl. ............... 174/135; 174/40 CC; 174/72 A; 248/74.5; 248/71
(58) Field of Classification Search .............. 248/74.5, 248/71, 67.5, 546, 547, 68.1; D8/356, 372, D8/373, 70; 174/135, 72 A, 40 CC, 68.1, 174/72 R
See application file for complete search history.

(56) References Cited

U.S. PATENT DOCUMENTS

| | | | | |
|---|---|---|---|---|
| 3,186,051 A | * | 6/1965 | Waddell | 174/135 |
| 3,188,030 A | * | 6/1965 | Fischer | 248/68.1 |
| 4,114,241 A | * | 9/1978 | Bisping | 248/68.1 |
| 4,775,121 A | * | 10/1988 | Carty | 248/68.1 |
| 4,801,064 A | * | 1/1989 | Mangone, Jr. | 248/71 |
| 4,903,920 A | * | 2/1990 | Merritt | 248/71 |
| 5,739,474 A | * | 4/1998 | Bradley | 174/135 |
| D398,218 S | * | 9/1998 | Coll et al. | D8/356 |
| 6,010,100 A | * | 1/2000 | Merritt | 248/71 |
| 6,378,811 B1 | * | 4/2002 | Potter et al. | 248/68.1 |
| 6,378,813 B1 | * | 4/2002 | Gretz | 248/68.1 |
| D472,783 S | * | 4/2003 | Gaudron | D8/70 |
| 6,889,944 B2 | * | 5/2005 | Brandzel et al. | 248/68.1 |
| 7,347,401 B1 | * | 3/2008 | Gretz | 248/68.1 |

* cited by examiner

Primary Examiner—Angel R Estrada
(74) Attorney, Agent, or Firm—Baker Botts L.L.P.

(57) ABSTRACT

The present invention provides a system of manually linked fastening clips for electrical cables. The manually linked clips are preferably linked to one another by way of a tongue-and-groove joint. Since the clips of the present invention are manually linkable via the tongue-and-groove joint, an installer may manually link electrical cable fasteners into numbered groupings of the installer's own choosing. The tongue-and-groove joint of the clips permits the installer to easily separate linked clips from one another by simply rotating one linked clip with respect to the other. This rotating action quickly and effortlessly disengages the tongue portion of one linked fastener from the corresponding groove portion of the other linked fastener, thereby facilitating the installation of electrical cable. The manually linked clips may be inserted into a clip dispensing sleeve to provide the installer with a continuous feed of cable fastening clips during installation.

10 Claims, 4 Drawing Sheets

SYSTEM AND METHOD FOR SECURING ELECTRICAL CABLE USING MANUALLY LINKABLE CABLE FASTENING CLIPS

BACKGROUND OF INVENTION

The present invention relates to techniques for securing electrical and telecommunications cable to a surface, and in particular, for securing electrical cable using one or more cable fastening clips.

Installing electric cable at a particular location often requires that the electrical cable be securely fastened to one or more surfaces. Typically, this is accomplished using conventional cable fastening clips, which are designed to attach and secure electrical cable to a surface without damaging the cable's outer protective sheathing.

Known clip systems exist that take a predetermined number of clips and gang them together at the point of manufacture. These ganged clips are separable from each other by a stamped, breakable link. The purpose of ganging the clips together is to make it easier for the installer to manipulate the fasteners during installation. For example, an installer may hold the ganged clips together in one hand, leaving his other hand free to use whatever tool may be needed (hammer, screwdriver, etc.) to actually fasten the clip, and its corresponding portion of electrical cable, to a particular surface. The installer thus does not need to use a hand to position a clip over the cable, thereby precluding the installer from hitting his or her hand with a hammer. Further, ganged clips reduce the number instances in which the hammer contacts fragile cable that may be breakable, such as fiberglass-based cable.

However, known ganged clip systems have certain distinct disadvantages. For example, since only one fastener is typically affixed at a time by the installer, each individual ganged fastener must be separated from the ganged group during installation. However, the stamped links used in conventional ganged clip systems are often difficult to break, which interferes with the cable installation process. Additionally, conventional ganged clips may produce sharp jagged edges when broken apart, thereby creating a hazard.

Another disadvantage stems from the fact that known ganged clip systems are comprised of discrete groups of clips of a predetermined number. There is no way for an installer using a known ganged clip system to add one ganged clip group to another ganged clip group, or to customize the number of clips in a particular group.

SUMMARY OF THE INVENTION

An object of the present invention is to overcome the disadvantages of the prior art by providing techniques for securing an electrical cable to a surface by way of a modular cable clip system which avoids ganged groups and readily permits customization.

In order to meet this and other objects of the present invention which will become apparent with reference to further disclosure set forth below, the present invention provides a system of manually linked fastening clips for electrical cables. In accordance with an exemplary embodiment of the present invention, the manually linked clips are preferably linked to one another by way of a tongue-and-groove joint. Since the clips of the present invention are manually linkable via the tongue-and-groove joint, an installer may manually link electrical cable fasteners into numbered groupings of the installer's own choosing.

Additionally, the tongue-and-groove joint of the clips in this exemplary embodiment permits the installer to easily separate linked clips from one another by simply rotating one linked clip with respect to the other. This rotating action quickly and effortlessly disengages the tongue portion of one linked fastener from the corresponding groove portion of the other linked fastener, thereby facilitating the installation of electrical cable. The disassembled clips of the exemplary embodiment separate cleanly and do not contain sharp jagged edges.

Furthermore, in accordance with an exemplary embodiment of the present invention, the manually linked clips may be inserted into a clip dispensing sleeve to provide the installer with a continuous feed of cable fastening clips during installation. This arrangement fosters a highly efficient, modular cable clip system and readily permits customization by the installer.

The accompanying drawings, which are incorporated and constitute part of this disclosure, illustrate preferred embodiments of the invention and serve to explain the principles of the invention.

BRIEF DESCRIPTION OF THE DRAWINGS

Throughout the figures, unless otherwise stated, the same reference numerals and characters are used to denote like features, elements, components, or portions of the illustrated embodiments.

DETAILED DESCRIPTION OF THE INVENTION

Figure 1:
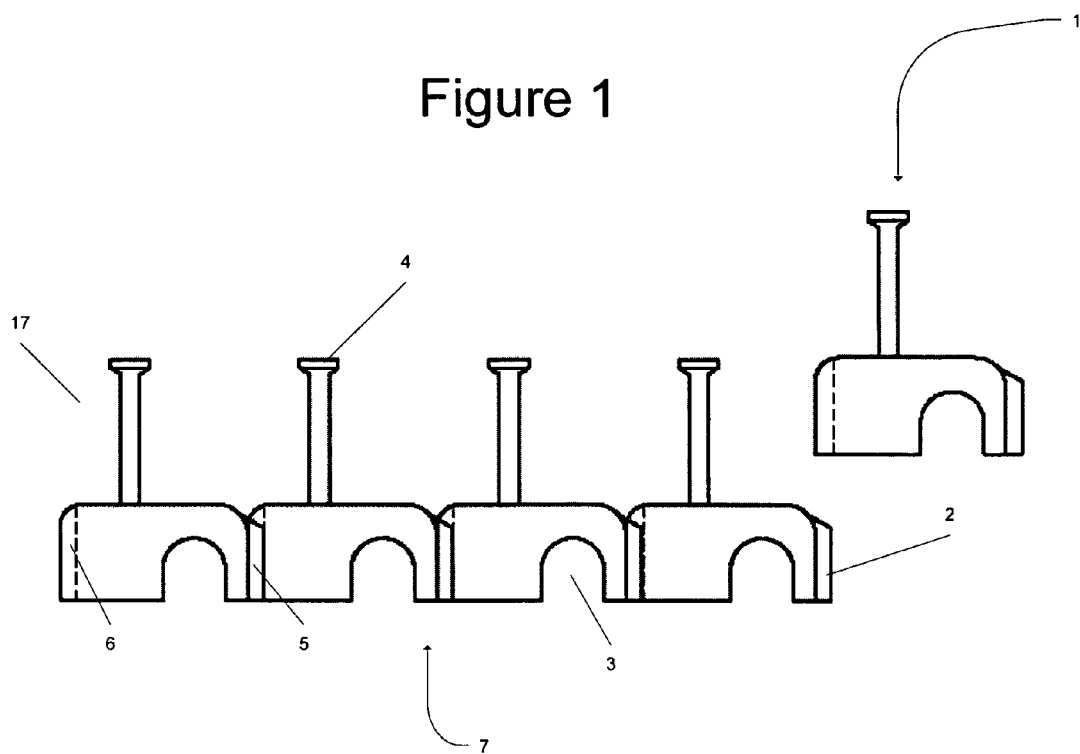
FIG. 1 is a diagram depicting a side view of an assembly of manually linked nail-type clips, in accordance with an exemplary embodiment of the present invention.
Figure 2:
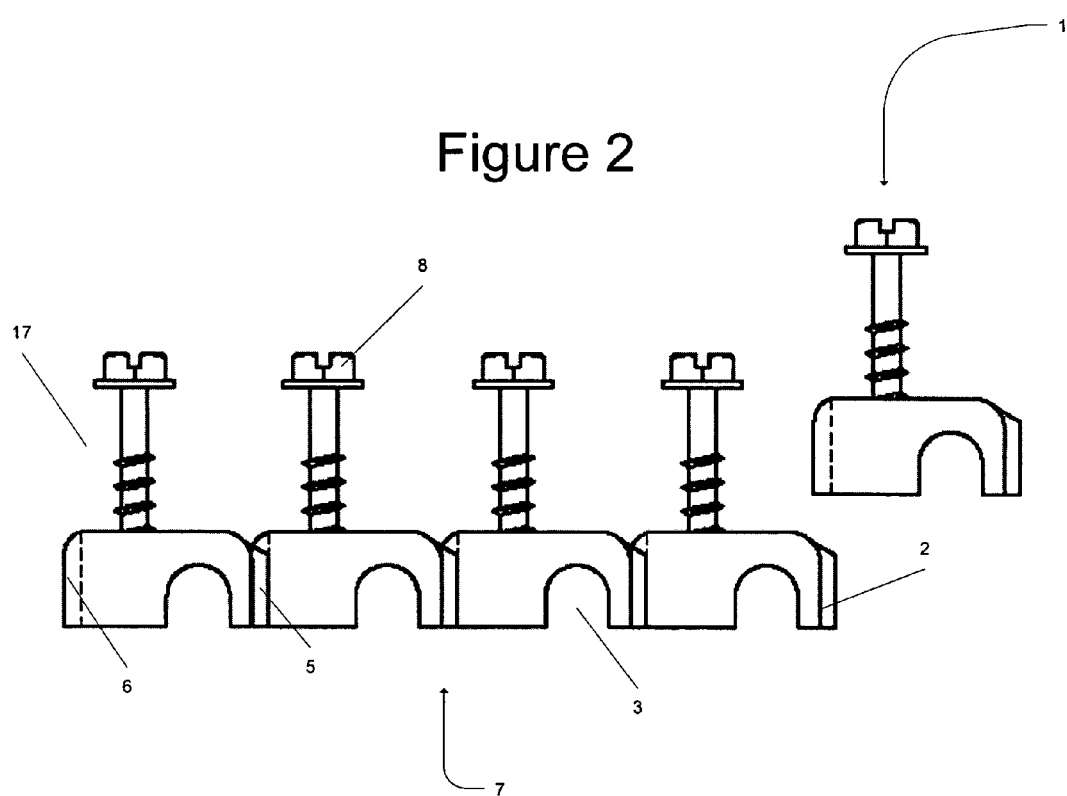
FIG. 2 is a diagram depicting a side view of an assembly of manually linked screw-type clips, in accordance with an exemplary embodiment of the present invention.
Figure 3:
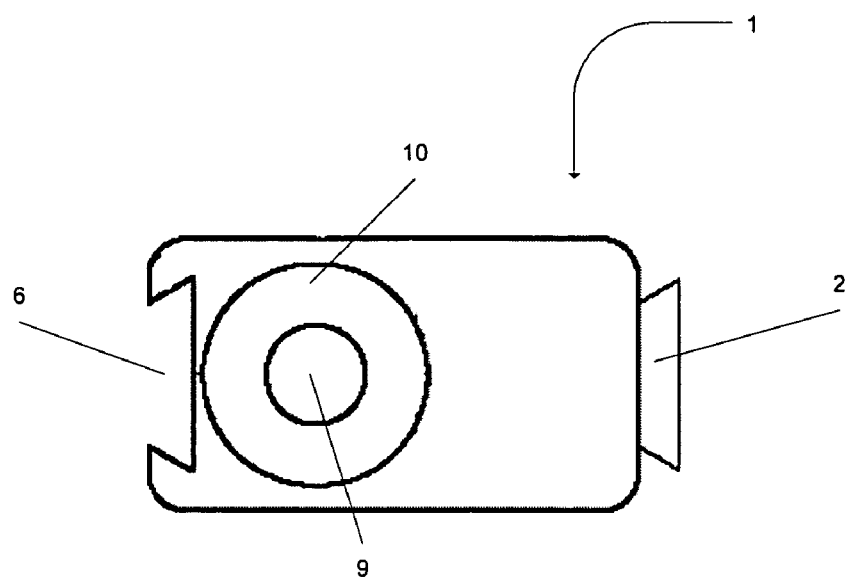
FIG. 3 is a diagram depicting a top view of a nail-type clip, in accordance with an exemplary embodiment of the present invention.
Figure 4:
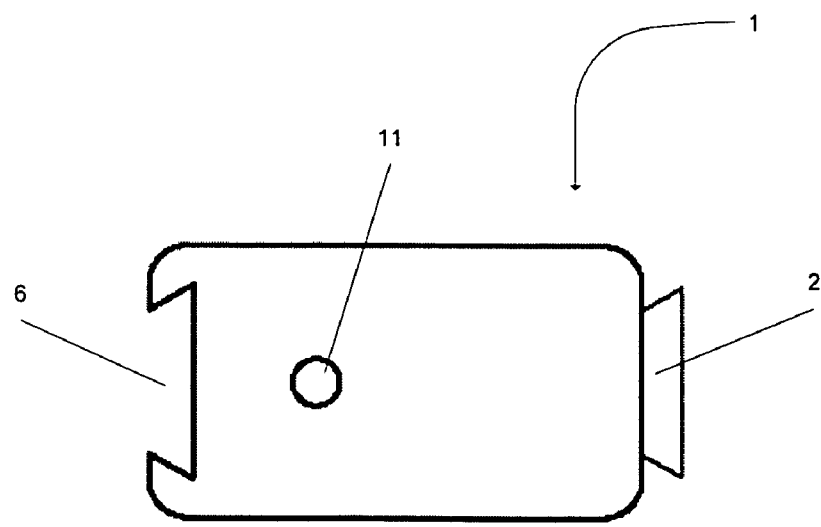
FIG. 4 is a diagram depicting a top view of a screw-type clip, in accordance with an exemplary embodiment of the present invention.

FIGS. 1 and 2 depict a side view of an assembly of manually linked nail-type clips 7 (FIG. 1) and screw-type clips 7 (FIG. 2) in accordance with an exemplary embodiment of the present invention. FIGS. 3 and 4 depict a top view of a nail-type clip 1 and screw-type clip 1 respectively, in accordance with an exemplary embodiment of the present invention.

An individual clip 1 preferably includes a groove portion 6 at one of the narrow ends of its body, and a corresponding tongue 2 at the opposite end. The clip 1 further includes a cable accommodating portion 3, which may be shaped, for example, as a hollow arch, but may alternatively have any other shape suitable for accommodating a cable. A cable 16 may be any electrical cable, including by way of example and without limitation, coaxial cable, fiber optic cable, or twisted pair cable.

Each clip 1 further includes an open channel 9, 11 (FIGS. 3 and 4). The channel 9, 11 accommodates a fastener through the height of the clip 1 which is positioned perpendicular to the clip assembly 7. The fastener may be a nail 4 or a screw 8 or any other type of fastening device.

The clips are manufactured from a material suitable for installing electrical cable, and should have proper mechanical properties in order to bear the stress caused by the weight of such cables, as those skilled in the art will appreciate. Preferably, the clips are formed from a UV-resistant polypropylene or polyethylene, but may be comprised of any other comparable material.

FIG. 3 is a diagram that depicts the top view of a manually linkable clip 1, in accordance with an exemplary embodiment of the present invention. The clip possesses an open channel 9 that accommodates a fastener that may be in the form of a screw 8. When the fastener is in the form of a screw 8, the clip 1 in FIG. 3 may contain a bed 10 for receipt of the screw 8 head.

Figure 5:
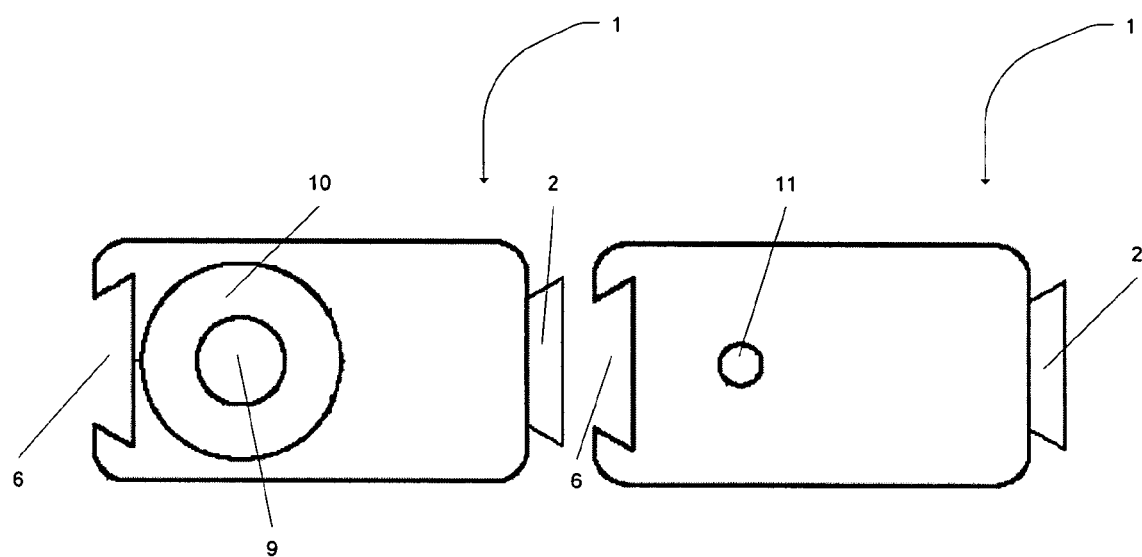
FIG. 5 is a diagram depicting a top view of two adjacent manually linkable clips, in accordance with an exemplary embodiment of the present invention.

FIGS. 1 and 5 are diagrams that depict, respectively, a side view and a top view of a manually linkable clip 1, in accordance with an exemplary embodiment of the present invention. Each clip 1 possesses a groove 6 at one of the narrow ends of its rectangular-shaped body, and a corresponding tongue 2 at the opposite end. The tongue 2 is inserted into the groove 6 of an adjacent clip 1 to form a link 5. The tongue 2 may be of a dovetail or other shape with a corresponding inverted groove 6 on the opposite end of the clip 1.

FIG. 5 is a diagram that depicts two adjacent clips 1 immediately prior to formation of a link 5, in accordance with an exemplary embodiment of the present invention. The link 5 is created when the tongue 2 of one clip is inserted into the groove 6 of an adjacent clip. Upon insertion of the tongue 2, the clip 1 position can be adjusted relative to a linked clip by manually sliding the tongue 2 vertically in the while it is contained in the groove 6.

Figure 6:
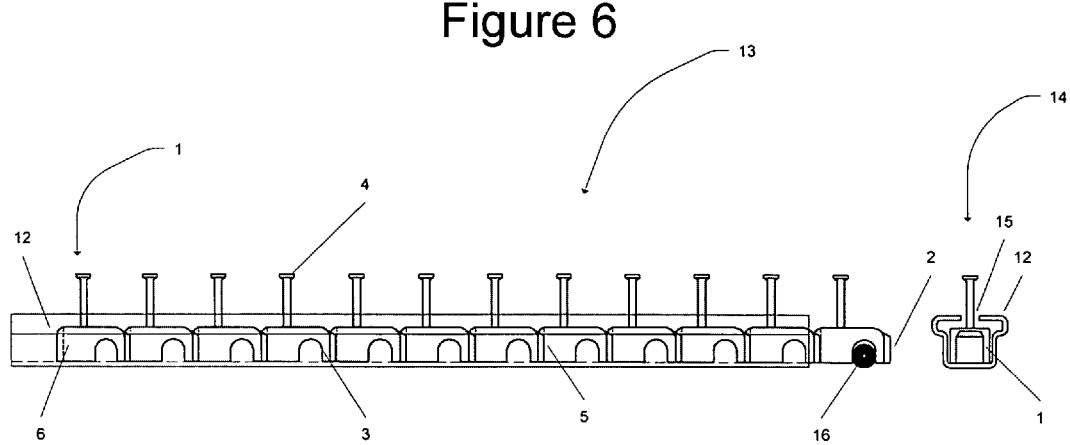
FIG. 6 is a diagram depicting a side view of an assembly of manually linked nail-type clips housed in a dispensing sleeve, in accordance with an exemplary embodiment of the present invention.
Figure 7:
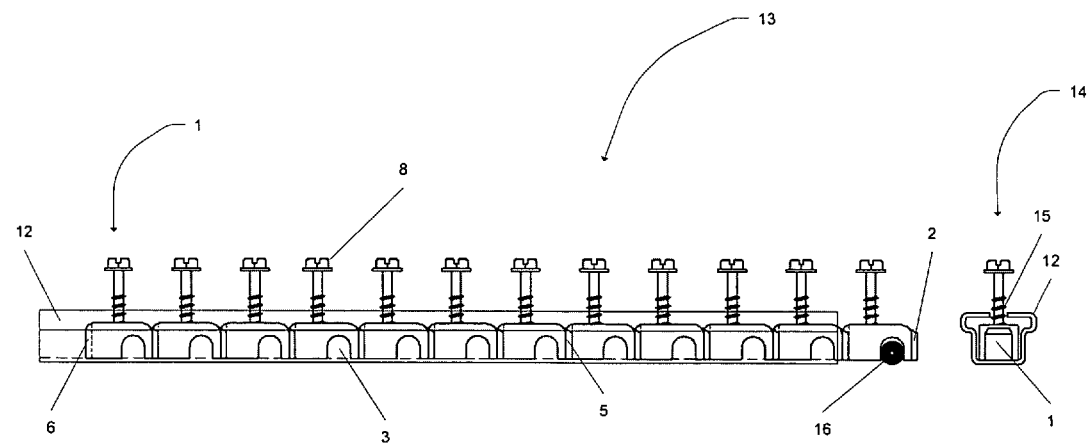
FIG. 7 is a diagram depicting a side view of an assembly of manually linked screw-type clips housed in a dispensing sleeve, in accordance with an exemplary embodiment of the present invention.

FIGS. 6 and 7 are diagrams that depict the placement of a clip 1 and a clip assembly 7 in a dispensing sleeve 12, in accordance with an exemplary embodiment of the present invention. The frontal view 14 shows the situation of the clip 1 within the dispensing sleeve 12. The narrow end of the clip 1 leads during the passage of the clip 1 through the dispensing sleeve 12. The fastener remains housed in the clip 1 by means of a channel 15 on the dorsal surface of the dispensing sleeve 12.

The dispensing sleeve 12 allows for passage of the fastener, positioned upright in the clip 1, through the dispensing sleeve 12. The fastener is unable to traverse the entirety of the clip 1 when the clip assembly 7 is contained within the dispensing sleeve 12 due to the flat bottom surface of the dispensing sleeve 12. As can be seen in the side view 13, when the clip assembly 7 is advanced within the dispensing sleeve 12, the first clip 1 in the clip assembly 7 exits the dispensing sleeve 12 with the tongue 2 leading. The cable accommodating portion 3 can then be positioned over a cable 16 and the fastener may be engaged in order to install the clip 1.

The installed clip is then separated from the remaining uninstalled assembly of clips 7 by applying rotational pressure to the dispensing sleeve 12. Separation of the clips requires less than 5 pounds of force be applied to the dispensing sleeve 12. The dispensing sleeve 12 remains supplied with clips 1 because any number of additional clips 1 can be added to the clip assembly 7 by inserting the tongue 2 of an additional clip 1 or clip assembly 7 into the corresponding groove 6 of the last clip 1 in the dispensing sleeve. To add clips 1 to the assembly 7, the installer simply advances the remaining clips 1 forward in the dispensing sleeve 12 to allow for additional clips 1 to be linked.

The foregoing merely illustrates the principles of the invention. Various modifications and alterations to the described embodiments will be apparent to those skilled in the art in view of the teachings herein. It will thus be appreciated that those skilled in the art will be able to devise numerous techniques which, although not explicitly described herein, embody the principles of the invention and are thus within the spirit and scope of the invention.

I claim:

1. A system for cable clip assembly, comprising two or more electrical cable clips, each adapted to secure an electrical cable to a surface,
   wherein each of said cable clips includes a tongue portion protruding from a first side thereof and a groove portion on a second side thereof, said first and second sides defining a first direction;
   wherein said groove portion of each said cable clips is adapted to link with a tongue portion of a different one of said cable clips; and
   wherein each said cable clips has a cable accommodating portion on the underside of the clip for securing cable along a second direction angled with respect to said first direction; and
   wherein said cable clips further comprise a fastening device; and
   wherein said cable clips are disposed within a dispensing sleeve, said fastening device being unable to traverse the entirety of said cable clips when said cable clips are disposed within said dispensing sleeve.

2. A system as recited in claim 1, wherein each said cable clips comprises UV-resistant polypropylene.

3. A system as recited in claim 1, wherein said fastening device is able to traverse the entirety of the clip from top to bottom.

4. A system as recited in claim 3, wherein said fastening device comprises a screw.

5. A system as recited in claim 3, wherein said fastening device comprises a nail.

6. A system for cable clip assembly, comprising:
   two or more electrical cable clips, each adapted to secure an electrical cable to a surface;
   means for manually linking a first of said cable clips to a second of said cable clips along a first direction,
   means for securing said electrical cable along a second direction angled with respect to said first direction, and
   means for fastening said cable clips to said surface, and
   means for dispensing said cable clips, said means for fastening is unable to traverse the entirety of said cable clips when said cable clips are disposed within said dispensing means, and
   means for separating a cable clip from a previously installed assembly of manually-linked clips.

7. A method of fastening one or more electrical cable clips, comprising the steps of:
   (a) placing at least first and second electrical cable clips, each adapted to secure an electrical cable to a surface, in a dispensing sleeve such that a groove portion of said first cable clip is linked to a tongue portion of said second cable clip, along a first direction, said cable clips including a fastening device, said fastening device being unable to traverse the entirety of said cable clips when said cable clips are disposed within said dispensing sleeve;

(b) securing said electrical cable along a second direction angled with respect to said first direction by fastening said first cable clip to said surface; and (c) manually separating said first cable clip from said second cable clip.

8. A method as recited in claim 7, wherein said step (c) comprises rotating said dispensing sleeve.

9. A method as recited in claim 7, wherein step (a) further comprises placing a third electrical cable clip in said dispensing sleeve such that a groove portion of said second cable clip is linked to a tongue portion of said third cable clip.

10. A method as recited in claim 7, wherein step (b) comprises fastening said first cable clip and other cable clips to said surface.

\* \* \* \* \*